July 6, 1943.  H. P. KUEHNI  2,323,715
THERMAL TESTING APPARATUS
Filed Oct. 17, 1941  2 Sheets-Sheet 1
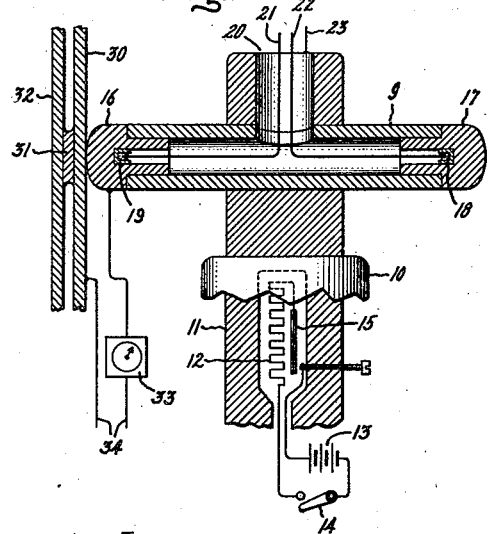
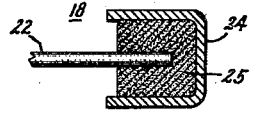
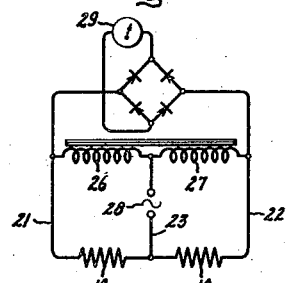
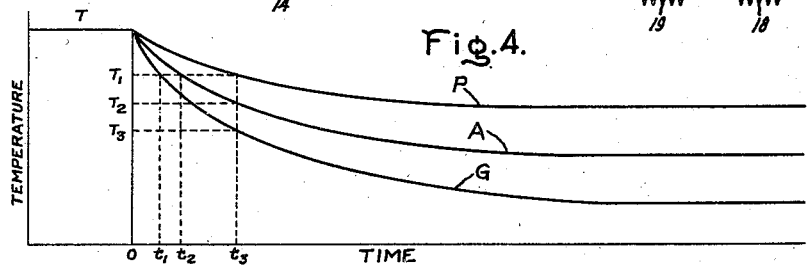
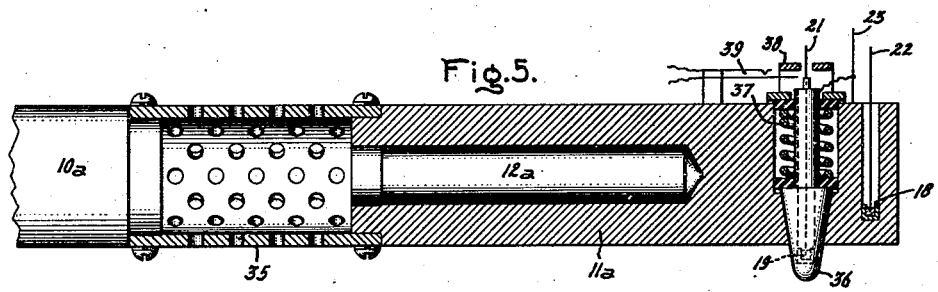
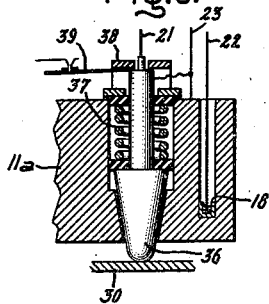
Inventor:
Hans P. Kuehni,
by Harry E. Dunham
His Attorney.

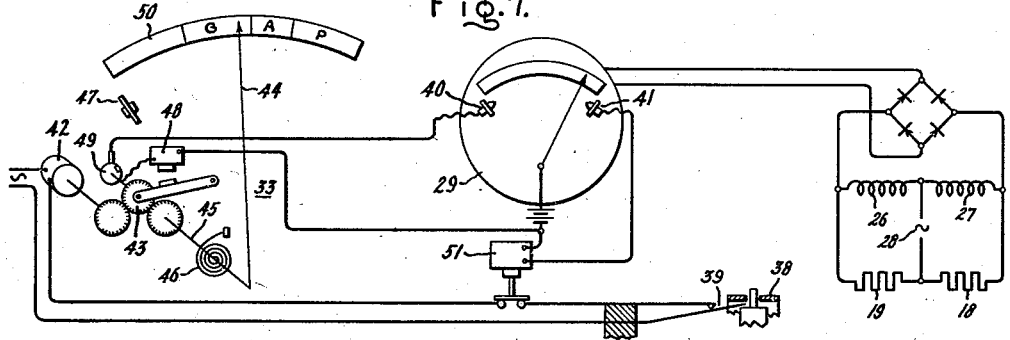
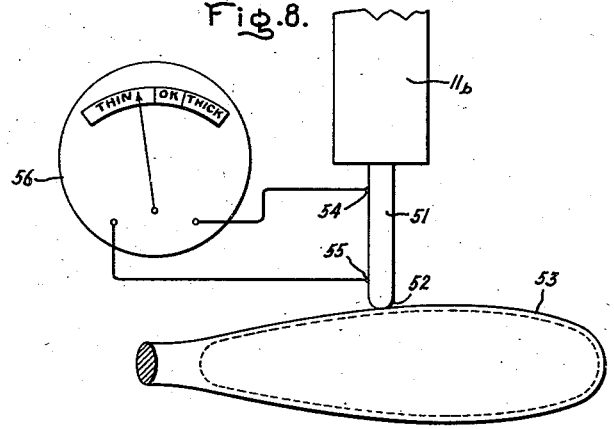
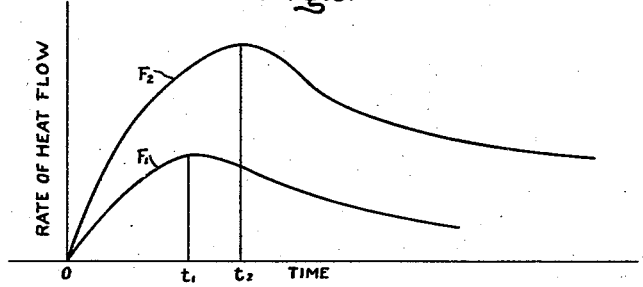
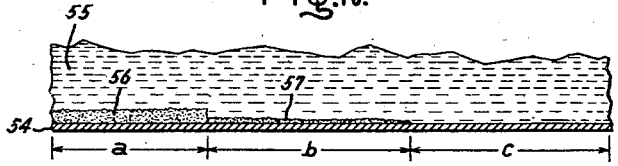
Inventor:
Hans P. Kuehni,
by Harry E. Dunham
His Attorney.

Patented July 6, 1943

2,323,715

UNITED STATES PATENT OFFICE 2,323,715

THERMAL TESTING APPARATUS

Hans P. Kuehni, Schenectady, N. Y., assignor to General Electric Company, a corporation of New York Application October 17, 1941, Serial No. 415,434

3 Claims. (Cl. 73—51)

My invention relates to apparatus for testing by measurement of thermal conductivity. For example, my invention is useful for determining whether a spot weld is good or bad by a measurement which depends upon the thermal conductivity of the weld. The invention may be used to determine the thickness of a known material and may be used for other purposes where the nature of the test being made depends upon the thermal conductivity of a material or materials.

The features of my invention which are believed to be novel and patentable will be pointed out in the claims appended hereto. For a better understanding of my invention reference is made in the following description to the accompanying drawings in which Fig. 1 represents a form of temperature responsive apparatus as applied to detecting the nature of spot welds. Fig. 2 is a detail view of a temperature sensitive resistance element which may be used in the apparatus of Fig. 1. Fig. 3 is a wiring diagram of an electric measuring circuit that may be used with the apparatus of Fig. 1. Fig. 4 illustrates time cooling curves explanatory of my invention. Figs. 5 and 6 represent another form of detector that may be used. Fig. 7 is a wiring diagram of an automatic timing feature which may be used with the apparatus of Fig. 5. Fig. 8 represents another form of detector apparatus in which comparative thermocouples are employed to measure rate of heat flow to the material being tested. Fig. 9 shows heat flow time curves explanatory of the apparatus of Fig. 8, and Fig. 10 represents different thicknesses of boiler scale which may be detected with the use of my invention.

Referring now to Fig. 1, 10 represents an elongated handle which will contain a body of metal 11 such as duralumin in which there is a cavity containing an electric heating resistor 12 connected to a suitable source of current 13 through a switch 14 for maintaining the mass of metal 11 at a high temperature. The circuit preferably contains an adjustable thermostat switch 15 for maintaining the temperature substantially constant at a desired high value. Except for the nature of the upper end of the device shown in Fig. 1, it is generally similar to an electric soldering iron. In place of a soldering iron head I have provided a head consisting of a metallic tube 9 made of Duralumin or other high melting point metal or alloy. This tube 9 is snugly fitted into a cross bore in the exposed end of the rod 11 so as to be in good thermal contact therewith. In to the opposite ends of tube 9 is fitted similar metal electrode elements 16 and 17, each containing similar thermal responsive devices such as thermocouples or temperature responsive resistance elements 18 and 19. The upper extremity of heat storage rod 11 contains a central opening 20 communicating with the interior of tube 9 and through which electrical connections 21 and 22 to the resistance elements 19 and 18 are carried. The other common connection to both resistance elements is formed through a wire 23 and the metallic structure of the apparatus.

The resistance elements 18 and 19 may comprise small nickel cups 24 which are pressed into cavities in the metal contact buttons 16 and 17. The cups are filled with baked sodium silicate or a baked mixture of iron oxide and borax or some other suitable resistance material 25 with the connecting wire forming an electrode in the center. The resistance elements specifically mentioned have a negative temperature coefficient of resistance, and the resistance drops rapidly with increasing temperature and increases rapidly when the temperature drops.

These resistance elements are connected in a measurement bridge circuit as shown in Fig. 3. Resistance elements 18 and 19 form two arms of the bridge and impedance coils 26 and 27 form the other arms. The bridge is supplied with an A.—C. voltage source 28 and measuring instrument 29 preferably of the rectifier type is connected across the bridge to detect and measure the unbalance thereof.

The detector is shown with metallic contact button 16 placed against a metal plate 30 which has been spot welded at 31 to another metal plate 32 for the purpose of testing the quality of the weld. The spacing of plates 30 and 32 has been shown somewhat exaggerated. Prior to bringing the button 16 against the plate 30 the metal mass heat storage 11 and the head parts 19, 16 and 17 are brought to and maintained at some high temperature such as 200 degrees C. and under this condition with the resistance elements 18 and 19 at the same temperature and resistance the bridge is balanced and the instrument 29 reads zero.

When the button 16 is brought against the metal plate 30 assumed to be at room temperature of, say, 25 degrees C., there occurs a transfer of heat from button 16 to plate 30. Such heat flows into plate 30 and away from the point of contact and it also flows primarily through weld material at 31 into plate 32, and resistance element 19 will drop in temperature as compared to resistance element 18 and the bridge will become unbalanced and produce a reading on instrument 29.

Other things being equal the rate of cooling of resistance element 19 will depend upon the nature of weld 31. If it is a good weld, heat will flow through it readily. If it is a poor weld, the heat transfer therethrough will be less and there will be less unbalance of the bridge and a smaller instrument deflection in a given short period of time. The operation may be pictured as in Fig. 4.

In Fig. 4 the ordinates represent temperature of resistance 19 and the abscissas time. Let T represent the original temperature of resistance 19 before button 16 is applied to plate 30. At zero time the button 16 is applied to plate 30 over weld 31. If the weld is poor the rate of cooling will be relatively slow, as per curve P. If the weld is very good, the rate of cooling will be comparatively rapid, as per curve G. For an average weld, the rate of cooling will be at some intermediate rate, as per curve A.

It is now seen that resistance element 19 will cool to a temperature $T_1$ corresponding to a given instrument deflection in a short time, $t_1$, an average time, $t_2$, or a longer time, $t_3$, depending upon whether the weld be good, average or poor. Thus one way of detecting the nature of the weld will be to note the time required for the instrument to reach a certain deflection.

For timing purposes I have represented an electric clock 33 which is connected to a timing source of supply 34 and for convenience in accurate timing I have shown the clock connection as being made through the metal parts 30 and 16 as a switch when button 16 is contacted with plate 30. When measurements are made as above described, the clock may be provided with a timing dial calibrated from zero time upwards as "good," "average" and "poor."

Instead of holding the detector on the weld until a certain deflection of instrument 29 is obtained, I may maintain the contact for a given short length of time, $t_3$, and read the deflection of instrument 29. In this case with a good weld the instrument 29 will correspond to a deflection of temperature $T_3$. With a poor weld, the instrument 29 will deflect considerably less in time $t_3$ and will correspond to a temperature $T_1$. In calibrating, welds of known qualities are tested.

It is now seen that I have provided a weld detector which can detect the quality of the weld when only one surface of the welded structure is accessible. It will, of course, be understood that results will vary with the thickness and kind of material being welded, and the apparatus should be carefully calibrated with suitable curves for different kinds and thickness of materials and with various welds, the qualities of which have been carefully determined by other tests, and other conditions which may influence the results. For example, if the room temperature is substantially different than 25 degrees C., say 40 degrees C., it may be assumed that the materials 30 and 31 are at 40 degrees C. and the rate of heat release in a given time from the 200 degree C. detector 11 will be less. Adjustment for this may be had by adjustment of the thermostat control 15 of the heater to hold a correspondingly higher temperature of the mass 11.

The usual calibrating expedients of the circuit of instrument 29 may also be employed. Contact buttons 16 of different contact areas and heat storage mass may be used. In order that the device may be used to test different welds in succession without loss of time, the heat storage mass of buttons 16 and 17 should be small, and small as compared to that of mass 11 and intervening parts so that when button 16 is removed from the plate 30 it will quickly return to the temperature of heat storage mass 11. Also, there should be no material change in temperature of plate 30 due to the small amount of heat conveyed thereto during a testing operation. Where, as here, the two ends 16 and 17 of the head are made identical, it may be advantageous to make alternate tests with alternate ends 16 and 17.

Figs. 5 and 6 represent a tester which is more sensitive in that the heated contact button which is placed in contact with the part to be tested is temporarily moved out of thermal connection with the heat storage mass. In Fig. 5 the heat storage mass $11a$ corresponds to part 11 of Fig. 1. $12a$ represents the electric heater therefor. $10a$ represents a handle which is connected to part $11a$ by a ventilated shell part 35. Resistance elements 18 and 19 are the same as in Fig. 1 but are mounted differently. Resistance element 18 is embedded in the mass $11a$ while resistance element 19 is embedded in a contact button 36 which is movable in a recess in mass $11a$. The button 36 is of metal, is of small heat storage capacity as compared to that of mass $11a$, is cone-shaped and is normally held tightly within a cone-shaped recess of part $11a$ by a spring 37 so as to be in good thermal contact with part $11a$. The contact button 36 has a small diameter hollow guide stem surrounded by spring 37. The connections to resistance element 19 are through this stem, one being through the material of the stem itself. When the button 36 is held against a plate 30 for test purposes, as in Fig. 6, it is moved upward within the recess to provide a conical-shaped air gap between it and the part $11a$ so that the good thermal connection between it and the part $11a$ is broken. Hence, button 36 cools rapidly and little heat is transferred thereto during the testing operation. However, as soon as the test is completed and the button is removed from testing position, spring 37 returns it into good thermal contact with part $11a$ and it is quickly heated to the temperature of part $11a$. A stop strap 38 secured to part $11a$ limits the upward movement of the button 36 when moved into testing position so that the air gap between it and the part $11a$ is always the same when in the test condition. The upward movement of button 36 to test position may also serve to close a switch part 39 in the clock circuit.

Fig. 7 illustrates a timing circuit wiring diagram that may be used with the apparatus of Figs. 5 and 6. The resistance bridge circuit is the same as that previously explained in connection with Fig. 3. The instrument 29, however, has adjustable contacts 40 and 41 near the lower and upper ends of its scale and its pointer serves as a movable contact to cooperate with the contacts 40 and 41 at selected indications.

The clock 33 is driven by a timer motor 42 through a gear train that may be interrupted by lifting the gear 43. The timer pointer 44 is mounted on a shaft 45. A spring 46 which is wound when the pointer 44 is advanced serves to return the pointer against a zero stop 47 when gear 43 is lifted. The gear 43 is lifted to demesh the gear train by an electromagnet 48 when the latter is energized. The electromagnet circuit is through the zero contact 40 and pointer of instrument 29 and through a contactor 49 operated from an extension of shaft 45 of the timer 33. The contacts 49 serve to open the circuit of electromagnet 48 when the timer pointer 44 is in or near a zero time indicating position at the left of its scale 50. The upscale contact 41 of instrument 29 is included in the circuit of a relay 51 which when energized opens the circuit of the timer motor 42.

The tester of Fig. 5 is used with the system of Fig. 7. With the heater 11a hot and contact electrode 36 in contact therewith, the bridge circuit will be balanced and instrument 29 will read zero and its pointer will engage contact 40. The pointer 44 of the timer will read zero at the left of its scale. Electromagnet 48 will have its circuit open at contact 49. The timer motor circuit will be open at switch 39.

The contact button 36 is now pressed against a part 30 to make a test as in Fig. 6. This closes the timer motor circuit at switch 39 and the timer motor starts and moves its pointer 44 upscale. Contact button 36 rapidly transfers its heat to part 30 and unbalances the bridge causing instrument 29 to deflect upscale until it engages contact 41. This energizes relay 51 and stops the timer which thus indicates on its scale the time required for the button 36 to drop in temperature by a given amount. If the flow of heat from button 36 has been rapid, indicating a good weld, the time indication of pointer 44 will be relatively short. Hence, for testing welds the scale 50 of the timer may be calibrated in terms of "good," "average" or "poor" welds reading upward from zero time position, as represented by the scale designations "G", "A" and "P". As soon as the timer motor is thus stopped, the test is completed and the button 36 may now be withdrawn from the test piece 30. This reopens the timer motor circuit at switch 39, and brings button 36 again into good thermal contact with heat storage mass 11a and the button is again quickly heated. The bridge returns to a balanced condition and the pointer of instrument 29 moves from contact 41 to contact 40. The timer motor circuit is reclosed at relay 51, electromagnet 48 is energized, gear 43 is lifted and the timer pointer returns to zero. As soon as pointer 44 returns to zero, electromagnet 48 is again deenergized by opening of its circuit at contact 49. The equipment is now ready for another test.

If the apparatus is used for the testing of sheet metal of a given material for the purpose of determining the thickness, the scale of the timer 33 will be calibrated in thickness units with the smallest thickness graduations at the upper end of the time scale. Likewise, if the sheet is of a known standard thickness and material, its heat conductivity may be tested.

Fig. 8 represents a modified form of my invention where the need of a time clock is dispensed with. In Fig. 8, 11b represents a heat storage mass corresponding to elements 11 and 11a in Figs. 1 and 5. It is provided with a rod-like extension 51 made, for example, of copper and firmly joined to the part 11b. The rod 51 is provided with a rounded contact point 52 at the end furthest from heat storage mass 11b, such that when point 52 is placed in contact with a cool test piece 53, heat will flow from 11b into test piece 53 through the rod 51 and cause a temperature drop along rod 51 which will be proportional to the rate of heat flow.

I provide a pair of thermocouples at different points 54 and 55 along rod 51 and connect these couples in series opposition to a sensitive measuring instrument 56. For example, rod 51 being of copper, I may make the instrument leads from points 54 and 55 of the material known as Copnic. The copper rod 51 and the lead from 54 form one thermocouple and the copper rod 51 and the lead from point 55 form another thermocouple. The copper rod connects these thermocouples in series bucking relation. The instrument deflection will, therefore, be proportional to the temperature drop between points 54 and 55 and this temperature drop will in turn be proportional to the rate of heat flow through the rod 51 between these points.

In Fig. 8 the test piece 53 represents a cast hollow propeller blade and the test illustrated is for the purpose of determining the thickness of the wall of the hollow casting. The method of determining this will become clearer from a consideration of Fig. 9. In Fig. 9 let the ordinates represent the rate of heat flow through rod 51 between points 54 and 55, and the abscissas represent time of contact of rod 51 with the test piece. At zero time or the instant of placing rod 51 on the test piece rod 51 will be at the high temperature, say 200 degrees C., of the heat storage mass 11b, and at this instant the rate of heat flow will be zero. When point 52 is pressed against piece 53 which may be at, say 25 degrees C., heat is transferred from the point 52 to test piece 53. Rod 51 is a secondary heat storage mass and the part adjacent the point 52 must start to cool before it draws appreciable heat from the upper part of the rod. The rate of heat flow through that part of the rod between points 54 and 55 thus increases progressively as per curve $F_2$ until it as at a maximum at time $t_2$ and then it starts to decrease as the adjacent portions of test piece 53 are heated and the upper end of rod 51 becomes cooler. The maximum rate of heat flow between any two points such as 54 and 55 is proportional to the rate of heat flow into test piece 53 and away from the point of contact with 52.

Other conditions remaining the same, the rate of heat transfer and the maximum temperature difference between points 54 and 55 is proportional to the thickness of the wall of the material of the test piece 53. Hence, the instrument 56 may be calibrated in terms of the thickness of the wall of the test piece. Curve $F_1$ represents the rate of heat transfer time curve for a test piece having a thinner wall than for the curve $F_2$. The maximum reading is less and occurs in a little shorter time after contact. Thus, with the arrangement of Fig. 8 time is taken into consideration but does not need to be measured because the curves of Fig. 9 include a function of time.

It is apparent that the apparatus of Figs. 1, 5 and 8 may be used to test spot welds and a variety of other factors. For example, in Fig. 10 I have represented a section of the wall 54 of a boiler containing water 55. Over the interior of section $a$ of the boiler I have represented a thick deposit of scale 56, over section $b$ a medium deposit of scale 57 and over section $c$ no scale at all. The metal shell 54 is a good heat conductor as also is the water 55. However, the scale is a relatively poor heat conductor and for that reason is detrimental in boilers generally. It is obvious that, using my invention, I can determine the relative amount of scale deposited on the interior of the boiler shell by applying my test apparatus to the accessible exterior of the boiler. In such application, if the general temperature of the boiler and water is, say 25 degrees C., the apparatus of Fig. 8 will give a maximum reading over section c, a minimum reading over section a and an intermediate reading over section b, because of the difference in the rate of heat transfer between the boiler shell and the water due to the scale deposit.

Thus, I have provided apparatus which is applicable to a large variety of test purposes where only one surface of the body or material to be tested is accessible.

What I claim as new and desire to secure by Letters Patent of the United States is:

1. Thermal conductivity testing apparatus comprising a heat storage mass, means for maintaining said mass at a substantially constant high temperature, a metallic rod of small heat storage capacity as compared to the mass extending from said mass and having an end portion adapted to be brought into thermal contact with a test piece such that heat will flow from the mass through the rod into the test part and produce a drop in temperature along the rod, and means for measuring the drop in temperature between two points spaced apart along said rod.

2. Thermal conductivity testing apparatus comprising a heat storage mass, means for maintaining said mass at a substantially constant predetermined high temperature, a metallic rod of small heat storage capacity as compared to the mass extending from said mass and terminating in an end part adapted to be placed in thermal contact with a low temperature test piece such as to produce heat flow thereto from the mass through the rod, a pair of thermocouples spaced apart along said rod, a sensitive measuring instrument and means including said rod for connecting said thermocouples in series opposition to said instrument.

3. Thermal conductivity testing apparatus comprising a main heat storage mass of metal and an auxiliary heat storage mass comprising a metallic rod extending from said mass and terminating in an end part which is adapted to be placed in thermal contact with a test piece, means for maintaining the main heat storage mass at a substantially constant predetermined high temperature, such that when the rod is brought into contact with a low temperature test piece there will be a flow of heat from the main mass to the test piece through the rod, and temperature responsive means for measuring the maximum rate of heat flow through said rod.

HANS P. KUEHNI.